United States Patent
Kwon

(10) Patent No.: US 9,942,883 B2
(45) Date of Patent: Apr. 10, 2018

(54) METHOD AND APPARATUS FOR ALLOCATING BANDWIDTH OF WIRELESS NETWORK WHERE BOTH WIDE-BAND AND NARROW-BAND SIGNALS ARE TRANSMITTED, AND METHOD AND APPARATUS FOR TRANSMITTING AND RECEIVING DATA ON THE NETWORK

(75) Inventor: Chang-Yeul Kwon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1914 days.

(21) Appl. No.: 11/939,092

(22) Filed: Nov. 13, 2007

(65) Prior Publication Data

US 2008/0112368 A1 May 15, 2008

Related U.S. Application Data

(60) Provisional application No. 60/858,396, filed on Nov. 13, 2006.

(30) Foreign Application Priority Data

Jun. 27, 2007 (KR) ........................ 10-2007-0063770

(51) Int. Cl.
*H04W 72/04* (2009.01)
*H04W 16/28* (2009.01)

(52) U.S. Cl.
CPC ........ *H04W 72/0406* (2013.01); *H04W 16/28* (2013.01); *H04W 72/046* (2013.01)

(58) Field of Classification Search
None
See application file for complete search history.

(56) References Cited

U.S. PATENT DOCUMENTS 4,229,828 A * 10/1980 Baird et al. .................... 455/326
4,259,647 A * 3/1981 Chang et al. .................... 331/96
(Continued)

FOREIGN PATENT DOCUMENTS

EP 0727885 A2 8/1996
KR 10-2002-0047181 A 6/2002
(Continued)

OTHER PUBLICATIONS

IEEE, IEEE 802.15 Task Group 3c, May 17, 2011, IEEE, one page.*
(Continued)

*Primary Examiner* — Alpus H Hsu
*Assistant Examiner* — Hooman Houshmand
(74) *Attorney, Agent, or Firm* — Sughrue Mion, PLLC

(57) ABSTRACT

Provided are a bandwidth-allocation method and apparatus for a wireless network based on a time division transmission mechanism, and a method and apparatus for transmitting and receiving data on the wireless network. The data transmission method includes at least one wireless device belonging to the wireless network transmitting a frame to a network coordinator, the frame including a transmission mode of data and used to request a time slot, receiving a beacon frame containing information about the transmission mode and a time slot duration from the network coordinator, and transmitting the data in the transmission mode to other wireless devices belonging to the wireless network during the duration of the time slot, wherein the transmission mode indicates whether the data is transmitted by a wide-band signal or a narrow-band signal.

20 Claims, 8 Drawing Sheets

(56) References Cited

U.S. PATENT DOCUMENTS

| | | | |
|---|---|---|---|
| 5,802,469 A * | 9/1998 | Nounin et al. | 455/422.1 |
| 5,914,942 A * | 6/1999 | Hassan et al. | 370/316 |
| 5,999,132 A * | 12/1999 | Kitchener et al. | 343/702 |
| 6,072,784 A * | 6/2000 | Agrawal et al. | 370/311 |
| 6,999,438 B2 * | 2/2006 | Nounin et al. | 370/332 |
| 7,349,436 B2 * | 3/2008 | Maltsev | H04L 5/0053 |
| | | | 370/471 |
| 7,826,475 B2 * | 11/2010 | Lee et al. | 370/445 |
| 2001/0012280 A1 * | 8/2001 | Dent | 370/335 |
| 2002/0060993 A1 * | 5/2002 | Dent | 370/321 |
| 2002/0102951 A1 * | 8/2002 | Nakano et al. | 455/118 |
| 2002/0196862 A1 * | 12/2002 | Dill et al. | 375/265 |
| 2003/0152059 A1 * | 8/2003 | Odman | H04B 1/69 |
| | | | 370/338 |
| 2004/0028003 A1 * | 2/2004 | Diener et al. | 370/319 |
| 2005/0036466 A1 * | 2/2005 | Malik | H04L 12/5695 |
| | | | 370/338 |
| 2005/0058153 A1 * | 3/2005 | Santhoff et al. | 370/466 |
| 2005/0078707 A1 * | 4/2005 | Maltsev et al. | 370/471 |
| 2005/0113102 A1 | 5/2005 | Kwon et al. | |
| 2005/0174964 A1 * | 8/2005 | Orlik | H04W 74/02 |
| | | | 370/329 |
| 2005/0195968 A1 * | 9/2005 | Park | H04L 27/2608 |
| | | | 379/406.08 |
| 2005/0239457 A1 * | 10/2005 | Levin et al. | 455/431 |
| 2006/0092880 A1 * | 5/2006 | Nounin et al. | 370/331 |
| 2007/0147361 A1 * | 6/2007 | Lee | H04W 16/28 |
| | | | 370/384 |
| 2008/0225790 A1 * | 9/2008 | Kupershmidt | 370/330 |
| 2009/0067389 A1 * | 3/2009 | Lee et al. | 370/336 |

FOREIGN PATENT DOCUMENTS

| | | |
|---|---|---|
| KR | 10-2005-0092042 A | 9/2005 |
| WO | 02/09298 A2 | 1/2002 |

OTHER PUBLICATIONS

Ji Eun Kim et al., "An Improvement of Channel Efficiency for IEEE 802.15.3 High Rate WPAN", Advanced Communication Technology, 2006, ICACT 2006, The 8th International Conference, Feb. 2006, pp. 1677-1680.

Xiaoqiao Meng et al., "Channel Access Using Opportunistic Reservations in Ad Hoc Networks", Mobile Ad Hoc and Sensor Systems (MASS), 2006 IEEE International Conference on Oct. 2006, pp. 71-80.

Park, "An Efficient QoS-Aware Bandwidth Re-Provisioning Scheme in a Next Generation Wireless Packet Transport Network", 2006, pp. 30-37, vol. 31, No. 1A.

Communication dated May 14, 2012 by the European Patent Office in counterpart European Application No. 07833948.8.

* cited by examiner

METHOD AND APPARATUS FOR ALLOCATING BANDWIDTH OF WIRELESS NETWORK WHERE BOTH WIDE-BAND AND NARROW-BAND SIGNALS ARE TRANSMITTED, AND METHOD AND APPARATUS FOR TRANSMITTING AND RECEIVING DATA ON THE NETWORK

CROSS-REFERENCE TO RELATED APPLICATIONS

This application claims priority from U.S. Provisional Patent Application No. 60/858,396 filed on Nov. 13, 2006 in the United States Patent and Trademark Office and Korean Patent Application No. 10-2007-0063770 filed on Jun. 27, 2007 in the Korean Intellectual Property Office, the disclosures of which are incorporated herein by reference in its entirety.

BACKGROUND OF THE INVENTION

1. Field of the Invention

Methods and apparatuses consistent with the present invention relate to wireless communication technology, and more particularly, to bandwidth-allocation in a wireless network based on a time division transmission mechanism, and transmitting and receiving data on the wireless network.

2. Description of the Related Art

As wireless communication networks become widely used, and a large-volume of multimedia data is transmitted through them, there is a need to develop a better and more efficient method of transmitting data over these networks. Due to existing characteristics of related art wireless networks, which are accessed by a large number of devices, operating characteristics of the related art wireless networks deteriorate with increased data traffic, which often results in data collision or loss during transmission. In order to prevent data collision or loss and to receive/transmit data in a reliable manner, a distributed coordination function (DCF) on a competitive basis and a point coordination function (PCF) on a non-competitive basis have been employed in wireless local area networks (LANs). In a wireless personal area network (PAN), channel time allocation has been employed.

Although these methods employed in the wireless networks reduce data collision to some degree and facilitate stable data transmission, there is still a high probability of data collision during transmission, compared to wired networks, due to various factors, such as multi-path fading and interference that affect stable data transmission. In addition, as the number of wireless devices that access a wireless network increases, data collision and loss increase.

The data collision and loss result in re-transmission of the lost data which adversely affects the throughput of a wireless network. In particular, for audio/video (A/V) data which require a high quality of service (QoS), it is a matter of great concern to have a sufficient bandwidth by reducing the number of retransmissions.

Moreover, in accordance with the growing demand for various home devices to wirelessly transmit high-quality videos, such as digital video disk (DVD) images or high definition television (HDTV) images, there is a significant demand for technical standards which can accomplish seamless communications of HDTV images.

The Institute of Electrical and Electronics Engineers (IEEE) 802.15.3c task group is developing a technological standard for transmitting a large volume of data over a wireless home network. The technological standard, which is called "millimeter wave (mmWave)", uses an electromagnetic wave having a physical wavelength in the millimeter range (i.e., an electromagnetic wave in the frequency band of 30-300 GHz) to transmit a large volume of data. This frequency band, which is an unlicensed band, has been used by communication service providers or used for limited purposes, such as observing electromagnetic waves or preventing vehicle collision.

FIG. 1 is a diagram which compares frequency bands of the IEEE 802.11 series of standards and mmWave. Referring to FIG. 1, the IEEE 802.11b or IEEE 802.11g standard uses a carrier frequency of 2.4 GHz and has a channel bandwidth of approximately 20 MHz. In addition, the IEEE 802.11a or IEEE 802.11n standard uses a carrier frequency of 5 GHz and has a channel bandwidth of approximately 20 MHz. In contrast, mmWave uses a carrier frequency of 60 GHz and has a channel bandwidth of approximately 0.5-2.5 GHz. Therefore, mmWave has a far greater carrier frequency and channel bandwidth than the related art IEEE 802.11 series of standards.

As described above, when a high-frequency signal (a millimeter wave) having a millimeter wavelength is used, a very high transmission rate of several Gbps can be achieved. Since the size of an antenna can also be reduced to less than 1.5 mm, a single chip which includes the antenna can be implemented. Furthermore, interference between devices can be reduced due to a very high attenuation ratio of the high-frequency signal in air.

The high-frequency signal has a very short Time of Arrival (TOA) due to such a high attenuation ratio. In addition, a straight-line path signal makes it difficult to properly accomplish communications in non-line-of-sight environments. Accordingly, the former problem is overcome by employing array antennas having a high gain. The latter problem can be overcome by exploiting a beam-steering or beam-forming mechanism.

There is a diversity of transmission schemes between such a wide-band signal and a signal of a general frequency band for use in wireless LAN or wireless PAN (hereinafter, to be referred to as a narrow-band signal). Accordingly, it is necessary to adaptively modify a bandwidth-reservation process in a network where both a wide-band signal and a narrow-band signal are transmitted, unlike in the network where only a narrow-band signal is transmitted.

SUMMARY OF THE INVENTION

The present invention provides a method and apparatus for bandwidth reservation in a network where both a wide-band signal and a narrow-band signal are transmitted, and data formats of various frames therefor.

The above and other aspects of the present invention will be described in or be apparent from the following description of exemplary embodiments.

According to an aspect of the present invention, there is provided a bandwidth-allocation method for transmitting data in a wireless network, the bandwidth-allocation method including receiving a first frame from at least one wireless device that belongs to the wireless network, wherein the first frame includes information indicating a transmission mode for transmitting the data, and is used to request a time slot; transmitting a second frame in response to the first frame to the at least one wireless device; and broadcasting a beacon frame containing information about the transmission mode and a time slot duration to the wireless network, wherein the transmission mode indicates whether the data is transmitted by a wide-band signal or a narrow-band signal.

According to another aspect of the present invention, there is provided a method for transmitting data in a wireless network, the method including causing at least one wireless device that belongs to the wireless network to transmit a first frame to a network coordinator, wherein the first frame includes information indicating a transmission mode for transmitting the data, and is used to request a time slot; receiving a beacon frame containing information about the transmission mode and a time slot duration from the network coordinator; and transmitting the data in the transmission mode to other wireless devices that belong to the wireless network during the time slot duration, wherein the transmission mode indicates whether the data is transmitted by a wide-band signal or a narrow-band signal.

According to still another aspect of the present invention, there is provided a method of receiving data in a wireless network, the method including causing at least one wireless device that belongs to the wireless network to receive a beacon frame containing information about a transmission mode for the data, an identifier of a wireless receiving device, and a time slot duration; if an identifier of the at least one wireless device is identical with the identifier of the wireless receiving device, adjusting the at least one wireless device to receive the data in the transmission mode; and receiving the data from another wireless device that belongs to the wireless network during the time slot duration, wherein the transmission mode indicates whether the data is transmitted by a wide-band signal or a narrow-band signal.

BRIEF DESCRIPTION OF THE DRAWINGS

The above and other aspects of the present invention will become apparent by describing in detail exemplary embodiments thereof with reference to the attached drawings, in which.

DETAILED DESCRIPTION OF EXEMPLARY EMBODIMENTS

Figure 1:
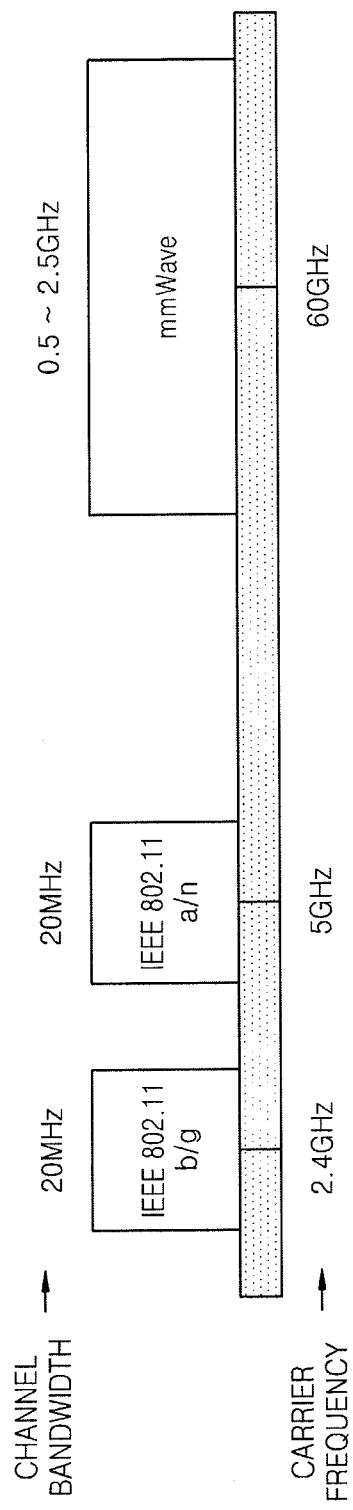
FIG. 1 is a diagram which compares frequency bands of the IEEE 802.11 series of standards and mmWave.

Aspects of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Hereinafter, the present invention is described more fully with reference to the accompanying drawings, in which exemplary embodiments are shown.

Figure 2:
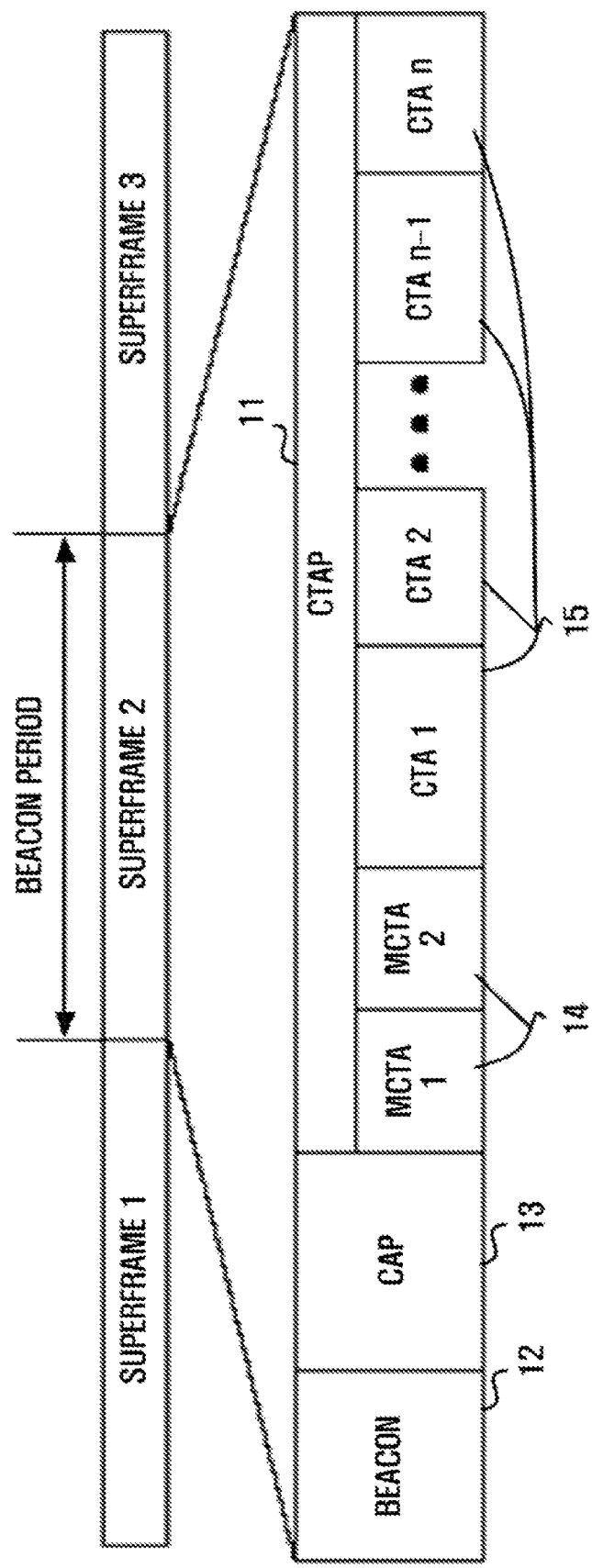
FIG. 2 illustrates a time division mechanism in accordance with IEEE 802.15.3.

FIG. 2 illustrates a time division mechanism in accordance with IEEE 802.15.3.

IEEE 802.15.3 media access control (MAC) is characterized by a rapidly established wireless network. Further, IEEE 802.15.3 MAC is not based on an access point (AP) but rather on an ad hoc network called a piconet controlled by a piconet coordinator (PNC). The IEEE 802.15.3 MAC adopts a time division multiple access (TDMA) system. A MAC frame for exchanging data between devices is embodied in a temporal structure called a superframe as shown in FIG. 2. The superframe is composed of a beacon 12 containing control information, a contention access period (CAP) 13 for transmitting data through backoff, and channel time allocation period (CTAP) 11 for transmitting data without contention within the allocated time. Here, competitive access can be made in both the CAP 13 and management channel time allocation (MCTA) 14. In detail, competitive access can be made in the CAP through a carrier sense multiple access/collision avoidance (CSMA/CA) system and a channel can be accessed in the MCTA through a slotted Aloha method.

The CTAP 11 can comprise a plurality of MCTAs 14 and a plurality of channel time allocations (CTAs) 15. CTAs 15 are classified into two types: a dynamic CTA and a pseudo-static CTA. The dynamic CTA can be changed in position in each superframe, but cannot be used in a relevant superframe if the beacon of a superframe is lost. In contrast, the pseudo-static CTA remains unchanged in the same fixed position, and can be used in the fixed position even if the beacon of a superframe is lost. However, the pseudo-static CTA cannot be used if a beacon is continuously lost more times than mMaxLostBeacons. Therefore, since the IEEE 802.15.3 MAC is based on the TDMA system capable of ensuring quality of service (QoS), it is particularly suitable for multimedia audio/video (A/V) streaming on a home network. Nevertheless, the MAC should be further improved to effectively utilize throughput as well as QoS. As described above, the IEEE 802.15.3 MAC is based on the TDMA system capable of ensuring a high level of QoS with respect to a narrow-band signal. However, it is necessary to adjust a bandwidth reservation process in a network where both a wide-band signal and a narrow-band signal are transmitted.

Figure 3:
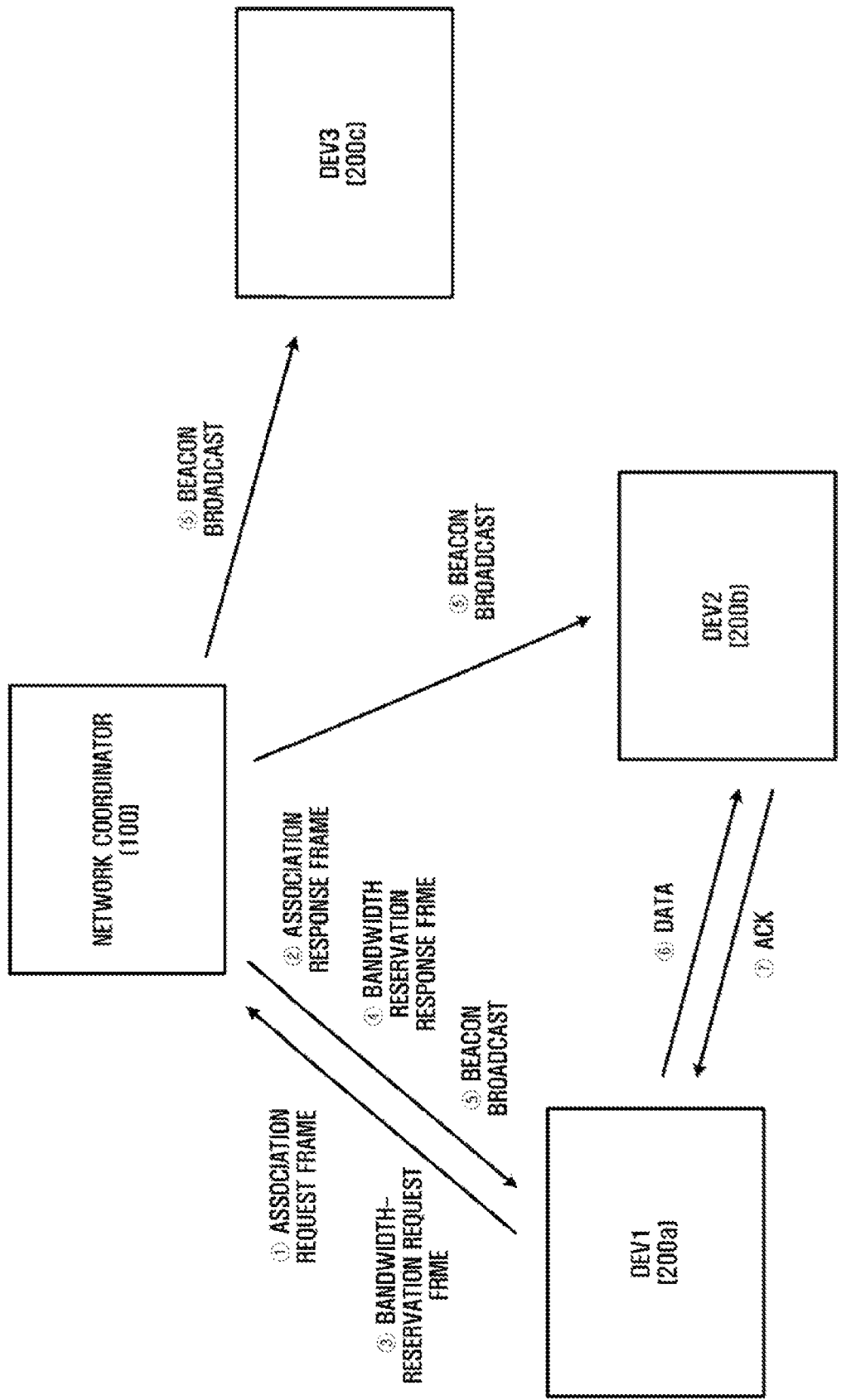
FIG. 3 illustrates the overall environment to which the present invention is applied.

FIG. 3 illustrates the overall environment to which the present invention is applied.

A network coordinator 100 and one or more devices 200a, 200b, and 200c constitute a network. The network coordinator 100 periodically broadcasts superframes during a beacon period. The beacon period is included in the superframe, and the network coordinator 100 broadcasts a beacon signal during the beacon period, thereby allowing the superframe to be transmitted to the respective devices 200a, 200b, and 200c.

Accordingly, the devices 200a, 200b, and 200c can transmit a control frame, a data frame, an acknowledgment (ACK), and so on within a contention period or a contention-free period contained in the superframe.

In order for a device 1 that does not belong to the network at an initial stage (hereinafter, to be referred to as DEV1), e.g., the device 200a, to join the network, DEV1 200a should transmit an association request frame to the network coordinator 100 through contention with the other devices 200b and 200c during a contention period of the superframe (①), and then receive an association response frame from the network coordinator 100 (②).

The association request frame may include, for example, a device address field, a device information field, and an association timeout period (ATP) field. The device address field has a hardware address of DEV1 200a transmitting the association request frame (e.g., the maximum MAC address of 8 bytes) recorded therein. In addition, the device information field has a variety of device information of DEV1 200a recorded therein, such as function, performance, capacity, or the like. For example, the device information field 44 indicates whether a corresponding device supports a high rate physical layer (HRP) mode for transmitting/receiving a wide-band signal or a low rate physical layer (LRP) mode for transmitting/receiving a narrow-band signal. In addition, the ATP field indicates a maximum period during which association can be maintained in a state where there is no communication between the network coordinator 100 and DEV1 200a. Disassociation takes place between the network coordinator 100 and DEV1 200a if communication is not established within the maximum period of time indicated in the ATP field.

In response to the association request frame, the network coordinator 100 transmits an association response frame to DEV1 200a. The association response frame contains a value indicative of acceptance or rejection of the association request.

If the association request from DEV1 200a is accepted by the network coordinator 100 through the association response frame, DEV1 200a finally becomes a member of the network. Then, in order for DEV1 200a to transmit data to a DEV2 200b, DEV1 200a should request a time slot for transmitting the data from the network coordinator 100 (③ of FIG. 3).

Figure 4:
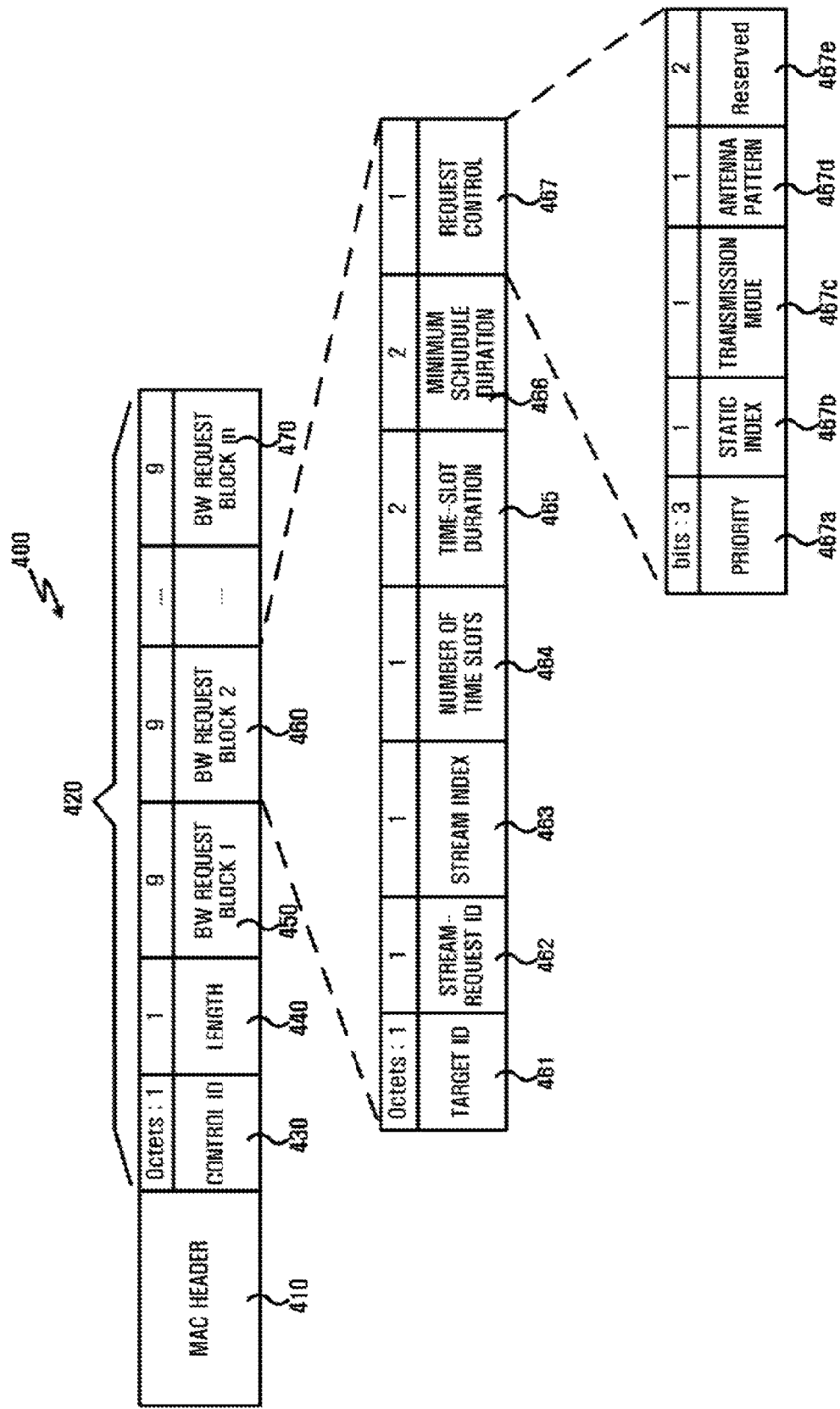
FIG. 4 illustrates a format of a bandwidth-reservation-request frame according to an exemplary embodiment of the present invention.

The time slot request is made by a bandwidth-reservation-request frame 400 shown in FIG. 4. The bandwidth-reservation-request frame 400 is a frame used to request a time ensured for data transmission, i.e., a time slot, from the network coordinator 100.

In the bandwidth-reservation-request frame 400, a payload 420 contains a control identifier (ID) field 430, a length field 440, and one or more bandwidth (BW) request blocks 450, 460, and 470. The control ID field 430 or the length field 440 are the same as those used in other control frames.

Among them, for example, the BW request block 460 includes a target ID field 461 specifying a device ID of at least one receiving device, a stream request ID field 462 identifying a version of the bandwidth-reservation-request frame 400, a stream index field 463 identifying data to transmit, a "number of time slots" field 464 indicating a number of time slots to be requested within a schedule duration of one superframe, a "time slot duration" field 465 indicating a duration of each time slot to be requested within a schedule duration of one superframe, a minimum-schedule-duration field 466 indicating a difference between start offsets of two adjacent time slots contained in the same superframe, and a request-control field 467.

The request-control field 467 is further divided into several subfields 467a through 467e. The request-control field 467 includes a priority field 467a, a static index field 467b, a transmission mode field 467c, and an antenna pattern field 467d. Since the request-control field 467 is a 1-octet (1-byte) field, 2-bit reserved field 467e may be additionally provided.

The static index field 467b has information regarding whether a static time slot or a dynamic time slot is requested recorded therein. The static time slot means a time slot recurring at the same position in each superframe, and the dynamic time slot means a time slot that is not fixed in position unlike the static time slot. For example, a static time slot is requested for transmitting isochronous data, while a dynamic time slot is requested for transmitting asynchronous data.

The priority field 467a has information about priority of a to-be-requested time slot recorded therein. The higher the priority is, the higher is the degree of requesting time slots to the network coordinator 100.

The transmission mode field 467c is a field indicating whether a transmission mode of data to be transmitted through a requested time slot is a wide-band signal transmission mode or a narrow-band signal transmission mode. The former is called the HRP mode, and the latter is the LRP mode.

The antenna pattern field 467d is a field indicating whether a signal for data transmission has directivity. The directivity is of an omni-directional type or a beam forming type. If the antenna pattern is an omni-directional pattern, omni-directional antennas are used in transmitting or receiving a signal, as specified in the IEEE 802.11 or IEEE 802.15.3 standard. If the antenna pattern is a beam forming type, in order to transmit or receive a wide-band signal, directivity of antennas (e.g., arrayed antennas) should be controlled in a signal-transmitted/received direction.

Figure 5:
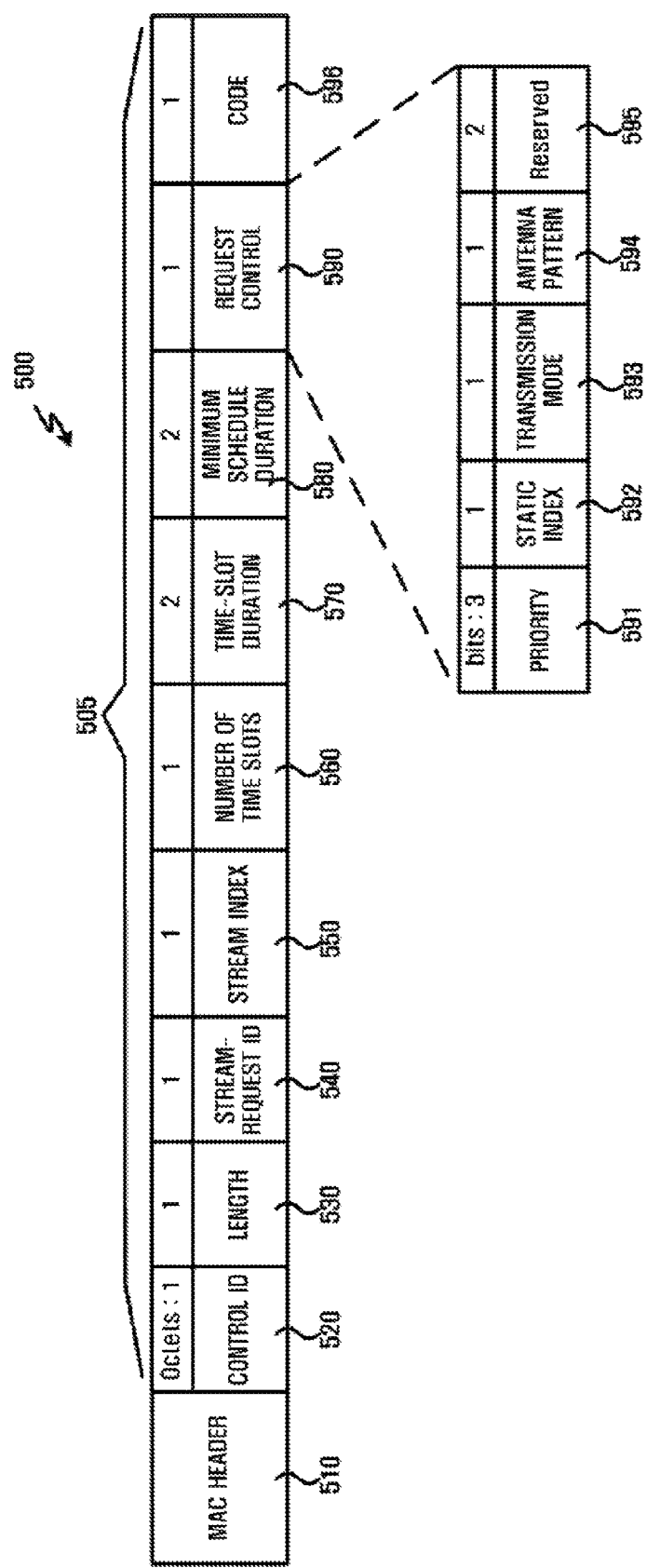
FIG. 5 illustrates a format of a bandwidth-reservation acknowledge (ACK) frame according to an exemplary embodiment of the present invention.

If DEV1 200a transmits the bandwidth-reservation-request frame 400 to the network coordinator 100 through contention with the other devices 200b and 200c during a contention period of a superframe (③), the network coordinator 100 sends the bandwidth-reservation-response frame 500 shown in FIG. 5 to DEV1 200a in response to the bandwidth-reservation-request frame 400 (④).

In the bandwidth-reservation-response frame 500, a payload 505 includes a control ID field 520, a length field 530, a stream request ID field 540, a stream index field 550, a "number of time slots" field 560, a time-slot-duration field 570, a minimum-schedule-duration field 580, and a request-control field 590. Like the bandwidth-reservation-request frame 400, the request-control field 590 includes a priority field 591, a static index field 592, a transmission mode field 593, an antenna pattern 594, and a reserved field 595.

Finally, a code field 596 has a value indicative of acceptance or rejection for the bandwidth-reservation request. For example, if the code field 596 has a value of 0, the value of 0 signifies acceptance of the bandwidth-reservation request. If the code field 596 has values other than 0, the values signify various reasons for rejection. Examples of the reasons for rejection include shortage of allocable time slots, inferior channel status, and so on.

After transmitting the bandwidth-reservation-response frame 500 to DEV1 200a, the network coordinator 100 broadcasts a beacon frame containing time slots allocated to the devices 200a, 200b, and 200c (⑤). If DEV1 200a receives the time slot contained in the broadcast beacon frame from the network coordinator 100, DEV1 200a can transmit data to a receiving device, e.g., DEV2 200b, during the allocated time slot (⑥). In response to the transmitted data, DEV2 200b may transmit an ACK frame to DEV1 200a (⑦).

Figure 6:
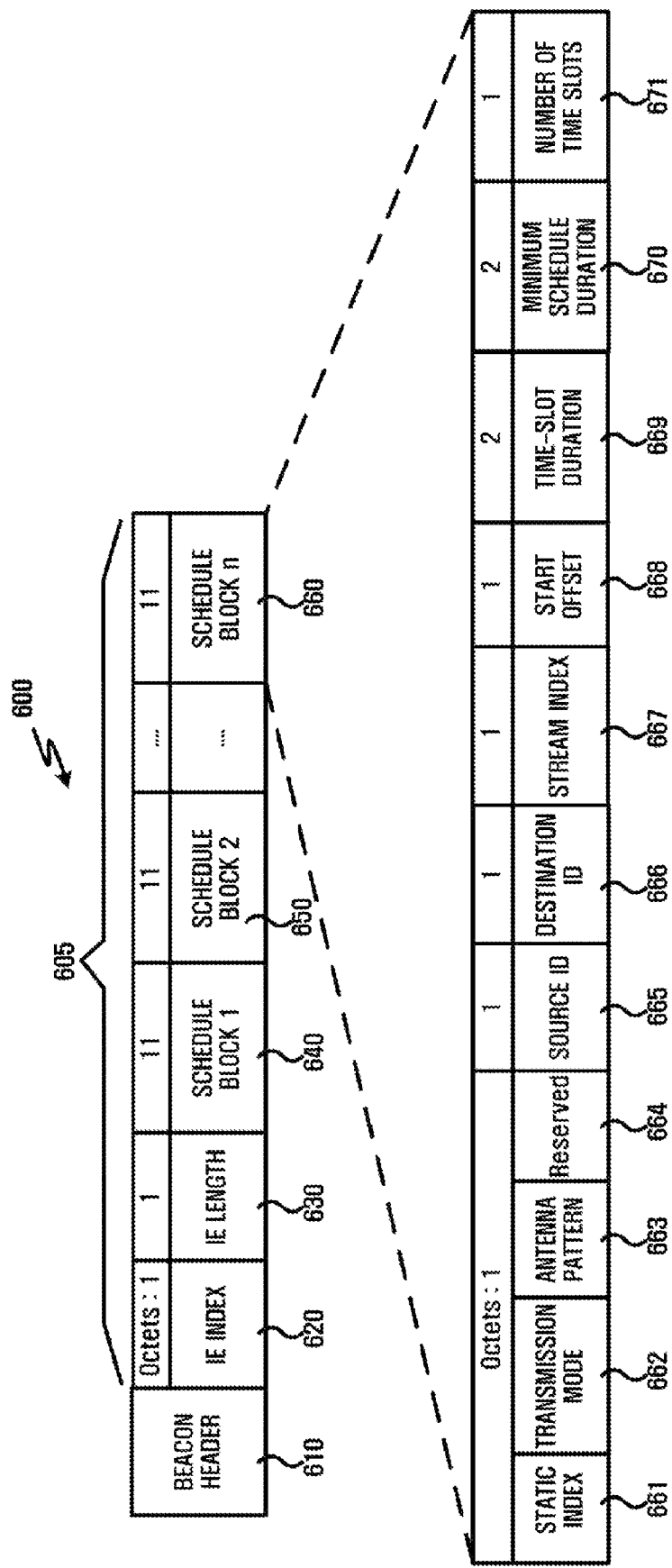
FIG. 6 illustrates a format of a beacon frame according to an exemplary embodiment of the present invention.

FIG. 6 illustrates a format of a beacon frame 600 according to an exemplary embodiment of the present invention.

The beacon frame 600 includes a beacon header 610 and an information element (IE) 605. The IE 605 includes an IE index 620 indicating the type of information element, an IE length 630 indicating the size of the information element, and a plurality of schedule blocks 640, 650, and 660.

One among the plurality of schedule blocks 640, 650, and 660 corresponds to one time slot and is used to broadcast information regarding data transmission performed within a single time slot to devices existing on a network.

In more detail, one exemplary schedule block 660 includes at least a time-slot-duration field 669, a transmission mode field 662, and an antenna pattern field 663. Further, schedule block 660 may include a static index field 661, a reserved field 664, a source ID field 665, a destination ID field 666, a stream index field 667, a start offset field 668, a minimum-schedule-duration field 670, and a "number of time slots" field 671.

The static index field 661 has information regarding whether a static time slot or a dynamic time slot is requested.

The transmission mode field 662 indicates whether data to be transmitted through a requested time slot is transmitted in an HRP mode or an LRP mode.

The antenna pattern field 663 is a field indicating whether a signal for data transmission has directivity. The directivity is of an omni-directional type or a beam forming type.

The reserved field 664 is a field for achieving octet-unit alignment, and is kept in reserve for providing additional functionality.

The stream index field 667 is a field for identifying a stream corresponding to the allocated time slot, i.e., a field for discriminating data to be transmitted.

The start offset field 668 specifies a start time of the first time slot within a schedule duration of a superframe. A value recorded in the start offset field 668 is an offset time from a start point of a beacon period.

The time-slot-duration field 669 is a field indicating a duration of each time slot allocated within a schedule duration of a superframe.

The minimum-schedule-duration field 670 is a field indicating a difference between start offsets of two adjacent time slots contained in the same superframe.

The "number of time slots" field 671 is a field indicating a number of time slots to be requested within the schedule duration of a superframe.

Figure 7:
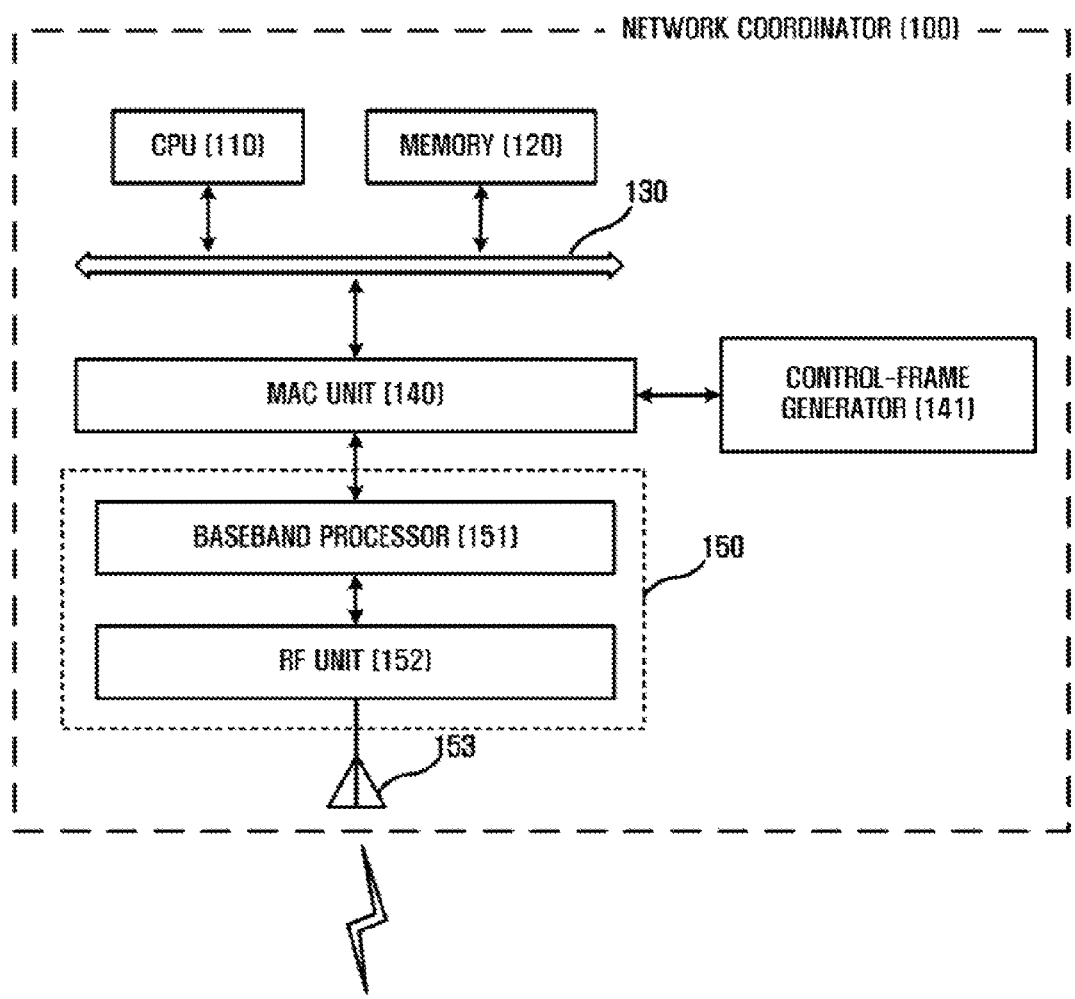
FIG. 7 is a block diagram of a network coordinator according to an exemplary embodiment of the present invention.

FIG. 7 is a block diagram of a network coordinator 100 according to an exemplary embodiment of the present invention.

The network coordinator 100 includes a central processing unit (CPU) 110, a memory 120, a MAC unit 140, a PHY unit 150, a control frame generator 141, and an antenna 153.

The CPU 110 controls other components connected to a bus 130, and is responsible for procedures in communication layers above a MAC layer. Thus, the CPU 110 processes data supplied from the MAC unit 140 as a received MAC service data unit (MSDU), or generates a transmitted MSDU to supply the same to the MAC unit 140.

The memory 120 stores the processed received MSDU or temporarily stores the generated transmitted MSDU. The memory 120 can be implemented by a non-volatile memory such as read-only memory (ROM), programmable read-only memory (PROM), erasable programmable read only memory (EPROM), electrically erasable programmable read only memory (EEPROM), a volatile memory such as a random access memory (RAM) or a storage medium, such as a hard disk drive, or other suitable memory, but the invention is not limited in this regard.

The MAC unit 140 adds a MAC header to the MSDU supplied from the CPU 110, i.e., the multimedia data to be transmitted, to then generate an MAC protocol data unit (MPDU). The generated MPDU is transmitted through the PHY unit 150. The MAC header is removed from the received MPDU from the PHY unit 150. As described above, the MPDU transmitted by the MAC unit 140 includes the beacon frame 600 transmitted during the beacon period, the association response frame responsive to the association request frame, and the bandwidth-reservation-response frame 500 responsive to the bandwidth-reservation-request frame 400. In addition, the MAC MPDU received by the MAC unit 140 includes the association request frame, and the bandwidth-reservation-request frame 400.

The control frame generator 141 generates control frames including an association response frame 500, a beacon frame 600, and so on. The association response frame 500 and the beacon frame 600 have a transmission mode, an antenna pattern, and the like.

Accordingly, the MAC unit 140 reads information on a transmission mode and an antenna pattern recorded in the bandwidth-reservation-request frame 400, and records the read transmission mode and antenna pattern in the bandwidth-reservation-response frame 500 and the beacon frame 600. Since the transmission mode and the antenna pattern are given for each time slot, the transmission mode and the antenna pattern may be provided only once in the bandwidth-reservation-response frame 500. However, in the beacon frame 600, the transmission mode and the antenna pattern are provided in each of the schedule blocks 640, 650, and 660.

Figure 8:
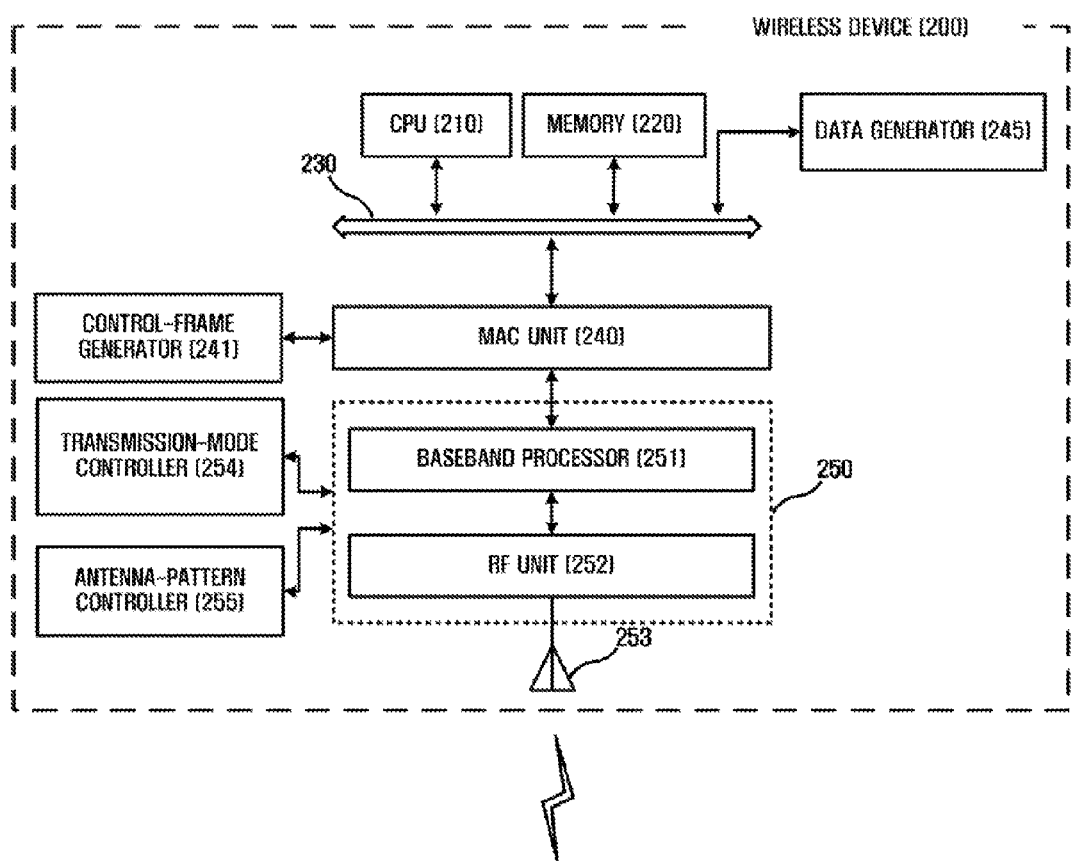
FIG. 8 is a block diagram of a wireless device according to an exemplary embodiment of the present invention.

A wireless device, e.g., a wireless device 200 as shown in FIG. 8, in the network receives the beacon frame 600 broadcast within a beacon period. When the beacon frame 600 has the destination ID 666 of the wireless device, the wireless device prepares to receive data for a time during which a predetermined time slot is allocated. Here, it is necessary to read a transmission mode and an antenna pattern contained in a schedule block corresponding to the time slot from the beacon frame 600 to normally receive data.

In more detail, the wireless device controls a PHY unit, e.g., a PHY unit 250 as shown in FIG. 8 to receive a wide-band signal when the transmission mode is an HRP mode, and controls the PHY unit to receive a narrow-band signal when the transmission mode is an LRP mode. In addition, the wireless device drives an antenna, e.g., an antenna 253 as shown in FIG. 8, omni-directionally when the antenna pattern is an omni-directional pattern, and drives the antenna in a direction of a wireless device to transmit the data when the antenna pattern is a beam-forming pattern.

In FIG. 7, the PHY unit 150 adds a signal field and a preamble to the MPDU supplied from the MAC unit 140 to then generate a PHY protocol data unit (PPDU). The generated PPDU, i.e., a data frame, is converted into a radio frequency (RF) signal to then be transmitted through the antenna 153. The PHY unit 150 is divided into a baseband processor 151 processing a baseband signal, and a RF unit 152 generating a RF signal from the processed baseband signal and transmitting the RF signal through the antenna 153.

In more detail, the baseband processor 151 performs frame formatting, channel coding, and so on. The RF unit 152 performs analog wave amplification, analog-to-digital conversion, modulation, and so on.

The control frame generator 142 generates control frames for controlling communications on the network, and supplies the generated control frames to the MAC unit 140. The control frames may include a beacon frame periodically broadcast over the network, a frame responding to a time slot request, a handover request frame, a frame for transmitting network information to a back-up coordinator, and so on.

FIG. 8 is a block diagram of a wireless device 200 according to an exemplary embodiment of the present invention. Among various components of the wireless device 200, basic functions of a CPU 210, a memory 220, a MAC unit 240 and a PHY unit 250 are substantially the same as those of the network coordinator 100.

A data generator 245 generates data which the wireless device 200 is to transmit during a predetermined time slot. If the generated data is large-volume data, which is difficult to transmit with a narrow-band signal (e.g., uncompressed AV data), it should be transmitted in an HRP mode, and if not, it should be transmitted in an LRP mode.

The control frame generator 241 generates control frames, such as an association request frame, or a bandwidth-reservation-request frame 400. The bandwidth-reservation-request frame 400 may have information regarding the transmission mode and the antenna pattern recorded therein. The transmission mode is determined according to whether the data generated by the data generator 245 is to be transmitted by a narrow-band signal or a wide-band signal. The antenna pattern is determined according to whether the antenna for transmitting the data is driven in an omni-directional pattern or in a beam-forming pattern.

After the network coordinator 100 grants data transmission using the bandwidth-reservation-response frame 500 in response to the bandwidth-reservation-request frame 400, the wireless device 200 identifies a position of a time slot through the beacon frame 600 broadcast by the network coordinator 100, and then transmits the data during a period of the corresponding time slot.

The MAC unit 240 adds a MAC header to the generated data to generate an MPDU, and transmits the MPDU through the PHY unit 250 when a start time of the time slot contained in the beacon frame 600 is reached.

Here, the transmission mode controller 254 identifies a transmission mode contained in a schedule block corresponding to the time slot in the beacon frame 600, and controls the RF unit 252 to transmit the data in the identified transmission mode. In more detail, the RF unit 252 performs data transmission by modulating the generated data into a wide-band signal when the transmission mode is an HRP mode, and modulating the generated data into a narrow-band signal when the transmission mode is an LRP mode.

In the same manner, the antenna pattern controller 255 identifies an antenna pattern contained in the schedule block and controls the RF unit 252 according to the identified antenna pattern. When the identified antenna pattern is an omni-directional pattern, the RF unit 252 controls the antenna 253 to be driven in an omni-directional pattern. When the identified antenna pattern is a beam-forming pattern, the RF unit 252 controls the antenna 253 to be driven in a direction of a wireless device to receive the data.

The wireless device 200 may operate not only as a transmitting device but also as a receiving device. Even when the wireless device 200 operates as a receiving device, the beacon frame 600 should be received and its contents should be read. The wireless device 200 receives the beacon frame 600 broadcast within a beacon period to then receive data during a period of a time slot in the beacon frame 600 in which the destination ID 666 is set to the wireless device 200 itself. Here, the MAC unit 240 of the wireless device 200 reads a transmission mode and an antenna pattern contained in a schedule block corresponding to the time slot from the beacon frame 600. The PHY unit 250 adjusts the wireless device 200 so as to receive the data in the transmission mode and the antenna pattern.

In other words, when a time corresponding to the time slot arrives, the transmission mode controller 254 controls the PHY unit 250 to receive a wide-band signal when the transmission mode is an HRP mode, and controls the PHY unit 250 to receive a narrow-band signal when the transmission mode is an LRP mode. In the same manner, the antenna pattern controller 255 controls an omni-directional antenna to be driven when the antenna pattern is an omni-directional pattern. When the antenna pattern is a beam-forming pattern, the antenna pattern controller 255 controls the antenna 253 to be driven in a direction of a wireless device which intends to transmit the data.

The components or blocks described with reference to the exemplary embodiments of the invention shown in FIGS. 7 and 8 may be realized as software executed in a predetermined region of a memory, such as classes, tasks, classes, sub-routines, processes, objects, executed threads, or programs, hardware such as a field programmable gate array (FPGA) or an application specific integrated circuit (ASIC), or a combination thereof. In addition, the components or blocks may be included in a computer-readable storage medium or parts thereof may be distributed in a plurality of computers.

As described above, according to the exemplary embodiments of the present invention, bandwidth reservation and wireless data transmission can be effectively performed in a network in which a wide-band signal and a narrow-band signal are both transmitted.

While the present invention has been particularly shown and described with reference to the exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A bandwidth-allocation method for transmitting data in a wireless network, comprising:
   receiving, by a network coordinator, an association request frame from a wireless device, wherein the association request frame includes:
   a device address field indicating a hardware address of the wireless device;
   a device information field indicating whether the wireless device supports a mode for transmitting and receiving wide-band signals or a mode for transmitting and receiving narrow-band signals, and
   an association timeout field indicating a maximum time period during which association between the network coordinator and the wireless device can be maintained in a state where there is no communication between the network coordinator and the wireless device;
   transmitting, by the network coordinator, an association response frame to the wireless device that indicates acceptance or rejection of the association request;

receiving, by the network coordinator, a first frame from the wireless device that belongs to the wireless network, wherein the first frame comprises a plurality of bandwidth request blocks, and each bandwidth request block comprises information indicating a transmission mode for transmitting the data from the wireless device to another wireless device that belongs to the wireless network and an identifier of the another wireless device, the transmission mode indicating whether the data is transmitted by a wide-band signal or a narrow-band signal, and the first frame is used by the wireless device to request a time slot;

wherein a first bandwidth request block among the plurality of bandwidth request blocks indicates that the data is transmitted by the wide-band signal, and a second bandwidth request block among the plurality of bandwidth request blocks indicates that the data is transmitted by the narrow-band signal;

transmitting, by the network coordinator, a second frame comprising a bandwidth response frame in response to the first frame to the wireless device, wherein the bandwidth response frame includes:
 a transmission mode field indicating whether the transmission mode is a wide-band signal or a narrow-band signal, and
 a value indicating acceptance or rejection of a bandwidth request; and broadcasting, by the network coordinator, a beacon frame comprising information about the transmission mode and a time slot duration to the wireless network.

2. The bandwidth-allocation method of claim 1, wherein each of the bandwidth request blocks and the beacon frame further comprise information on an antenna pattern indicating whether a signal for transmitting the data has directivity.

3. The bandwidth-allocation method of claim 2, wherein if the transmission mode is a wide-band signal mode, the antenna pattern is a beam-forming pattern, and if the transmission mode is a narrow-band signal mode, the antenna pattern is an omni-directional pattern.

4. The bandwidth-allocation method of claim 3, wherein the data is transmitted by a wide-band signal if the data is uncompressed audio/video (AV) data, and an antenna of the wireless device is driven by a beam-forming pattern when the data is transmitted.

5. The bandwidth-allocation method of claim 1, wherein the wide-band signal has a wavelength in a millimeter range.

6. The bandwidth-allocation method of claim 1, wherein the wide-band signal is transmitted in a channel having a channel bandwidth of 0.5-2.5 GHz.

7. The bandwidth-allocation method of claim 1, wherein the first frame is transmitted by the wireless device during a contention period, and the second frame and beacon frame are transmitted during a contention-free period.

8. The bandwidth-allocation method of claim 1, wherein the information indicating the transmission mode for transmitting the data from the wireless device is a request to transmit the data from the wireless device.

9. The bandwidth-allocation method of claim 1, wherein the first frame further comprises a media access control frame of a time division multiple access system and the network coordinator comprises a piconet coordinator.

10. The bandwidth-allocation method of claim 1, wherein the wide-band signal is a millimeter wave signal, and the narrow-band signal is either a 2.4 GHz signal or a 5 GHz signal.

11. A bandwidth-allocation apparatus for transmitting data in a wireless network, comprising:
 a receiving unit, of a network coordinator, that receives an association request frame from a wireless device, wherein the association request frame includes:
  a device address field indicating a hardware address of the wireless device,
  a device information field indicating whether the wireless device supports a mode for transmitting and receiving wide-band signals or a mode for transmitting and receiving narrow-band signals, and
  an association timeout field indicating a maximum time period during which association between the network coordinator and the wireless device can be maintained in a state where there is no communication between the network coordinator and the wireless device;
 a transmitting unit, of the network coordinator, that transmits an association response frame to the wireless device that indicates acceptance or rejection of the association request;
 wherein the receiving unit also receives a first frame from a wireless device that belongs to the wireless network, wherein the first frame comprises a plurality of bandwidth request blocks, and each bandwidth request block comprises information indicating a transmission mode for transmitting data from the wireless device to another wireless device that belongs to the wireless network and an identifier of the another wireless device, the transmission mode indicating whether the data is transmitted by a wide-band signal or a narrow-band signal, and the first frame is used by the wireless device to request a time slot;
 wherein a first bandwidth request block among the plurality of bandwidth request blocks indicates that the data is transmitted by the wide-band signal, and a second bandwidth request block among the plurality of bandwidth request blocks indicates that the data is transmitted by the narrow-band signal;
 wherein the transmitting unit, of the network coordinator, transmits a second frame comprising a bandwidth response frame in response to the first frame to the wireless device, wherein the bandwidth response frame includes:
  a transmission mode field indicating whether the transmission mode is a wide-band signal or a narrow-band signal, and
  a value indicating acceptance or rejection of a bandwidth request; and
 a broadcasting unit, of the network coordinator, that broadcasts a beacon frame comprising information about the transmission mode and a time slot duration to the wireless network.

12. The bandwidth-allocation apparatus of claim 11, wherein each of the bandwidth request blocks and the beacon frame further comprise information on an antenna pattern indicating whether a signal for transmitting the data has directivity.

13. The bandwidth-allocation apparatus of claim 12, wherein if the transmission mode is a wide-band signal mode, the antenna pattern is a beam-forming pattern, and if the transmission mode is a narrow-band signal mode, the antenna pattern is an omni-directional pattern.

14. The bandwidth-allocation apparatus of claim 13, wherein the data is transmitted by a wide-band signal if the data is uncompressed audio/video (AV) data, and an antenna of the wireless device is driven by a beam-forming pattern when the data is transmitted.

15. The bandwidth-allocation apparatus of claim 11, wherein the wide-band signal has a wavelength in a millimeter range.

16. The bandwidth-allocation apparatus of claim 11, wherein the wide-band signal is transmitted in a channel having a channel bandwidth of 0.5-2.5 GHz.

17. A method of transmitting data in a wireless network, comprising:
- transmitting, by a wireless device, an association request frame to a network coordinator, wherein the association request frame includes:
  - a device address field indicating a hardware address of the wireless device,
  - a device information field indicating whether the wireless device supports a mode for transmitting and receiving wide-band signals or a mode for transmitting and receiving narrow-band signals, and
  - an association timeout field indicating a maximum time period during which association between the network coordinator and the wireless device can be maintained in a state where there is no communication between the network coordinator and the wireless device;
- receiving, by the wireless device, an association response frame from the network coordinator that indicates acceptance or rejection of the association request;
- transmitting, by the wireless device that belongs to the wireless network, a first frame to the network coordinator, wherein the first frame comprises a plurality of bandwidth request blocks, and each bandwidth request block comprises information indicating a transmission mode for transmitting the data from the wireless device to another wireless device that belongs to the wireless network and an identifier of the another wireless device, the transmission mode indicating whether the data is transmitted by a wide-band signal or a narrow-band signal, and the first frame is used by the wireless device to request a time slot;
- wherein a first bandwidth request block among the plurality of bandwidth request blocks indicates that the data is transmitted by the wide-band signal, and a second bandwidth request block among the plurality of bandwidth request blocks indicates that the data is transmitted by the narrow-band signal;
- receiving, by the wireless device, a second frame comprising a bandwidth response frame in response to the first frame, wherein the bandwidth response frame includes:
  - a transmission mode field indicating whether the transmission mode is a wide-band signal or a narrow-band signal, and
  - a value indicating acceptance or rejection of a bandwidth request; and
- receiving, by the wireless device, a beacon frame comprising information about a time slot duration for transmitting the data in the transmission mode, from the network coordinator; and
- transmitting, by the wireless device, the data in the transmission mode to other wireless devices that belong to the wireless network during the time slot duration.

18. A wireless device for wireless communication in a wireless network to which the wireless device belongs, comprising:
- a transmitting unit that transmits an association request frame to a network coordinator, wherein the association request frame includes:
  - a device address field indicating a hardware address of the wireless device,
  - a device information field indicating whether the wireless device supports a mode for transmitting and receiving wide-band signals or a mode for transmitting and receiving narrow-band signals, and
  - an association timeout field indicating a maximum time period during which association between the network coordinator and the wireless device can be maintained in a state where there is no communication between the network coordinator and the wireless device;
- a receiving unit that receives an association response frame from the network coordinator that indicates acceptance or rejection of the association request;
- wherein the transmitting unit transmits a first frame to a network coordinator of the wireless network, wherein the first frame comprises a plurality of bandwidth request blocks, and each bandwidth request block comprises information indicating a transmission mode for transmitting data from the wireless device to another wireless device that belongs to the wireless network and an identifier of the another wireless device, the transmission mode indicating whether the data is transmitted by a wide-band signal or a narrow-band signal, and the first frame is used by the wireless device to request a time slot;
- wherein a first bandwidth request block among the plurality of bandwidth request blocks indicates that the data is transmitted by the wide-band signal, and a second bandwidth request block among the plurality of bandwidth request blocks indicates that the data is transmitted by the narrow-band signal;
- wherein the receiving unit also receives a second frame comprising a bandwidth response frame in response to the first frame, wherein the bandwidth response frame includes:
  - a transmission mode field indicating whether the transmission mode is a wide-band signal or a narrow-band signal, and
  - a value indicating acceptance or rejection of a bandwidth request; and
- wherein the receiving unit also receives a beacon frame comprising information about a time slot duration for transmitting the data in the transmission mode, from the network coordinator; and
- a data transmitting unit that transmits the data in the transmission mode to other wireless devices that belong to the wireless network during the time slot duration.

19. A method of receiving data in a wireless network, comprising:
- transmitting, by a wireless device, an association request frame to a network coordinator, wherein the association request frame includes:
  - a device address field indicating a hardware address of the wireless device,
  - a device information field indicating whether the wireless device supports a mode for transmitting and receiving wide-band signals or a mode for transmitting and receiving narrow-band signals, and
  - an association timeout field indicating a maximum time period during which association between the network coordinator and the wireless device can be maintained in a state where there is no communication between the network coordinator and the wireless device;

receiving, by the wireless device, an association response frame from the network coordinator that indicates acceptance or rejection of the association request;

transmitting, by the wireless device that belongs to the wireless network, a first frame comprising a bandwidth request frame to the network coordinator;

receiving, by the wireless device, a second frame comprising a bandwidth response frame in response to the first frame, wherein the bandwidth response frame includes:
- a transmission mode field indicating whether the transmission mode is a wide-band signal or a narrow-band signal, and
- a value indicating acceptance or rejection of a bandwidth request; and causing the wireless device that belongs to the wireless network to receive a beacon frame, from the network coordinator, comprising a plurality of scheduling blocks, and each scheduling block comprises information about a transmission mode for the data transmitted from another wireless device that belongs to the wireless network, an identifier of a wireless receiving device, and a time slot duration, wherein the transmission mode indicates whether the data is transmitted by a wide-band signal or a narrow-band signal;

wherein a first scheduling block among the plurality of scheduling blocks indicates that the data is transmitted by the wide-band signal, and a second scheduling block among the plurality of scheduling blocks indicates that the data is transmitted by the narrow-band signal;

wherein if an identifier of the wireless device is identical with the identifier of the wireless receiving device, adjusting the wireless device to receive the data in the transmission mode; and receiving the data from the other wireless device that belongs to the wireless network during the time slot duration.

20. A wireless device for wireless communication in a wireless network to which the wireless device belongs, comprising:
- a transmitting unit that transmits an association request frame to a network coordinator, wherein the association request frame includes:
  - a device address field indicating a hardware address of the wireless device,
  - a device information field indicating whether the wireless device supports a mode for transmitting and receiving wide-band signals or a mode for transmitting and receiving narrow-band signals, and
  - an association timeout field indicating a maximum time period during which association between the network coordinator and the wireless device can be maintained in a state where there is no communication between the network coordinator and the wireless device;
- a receiving unit that receives an association response frame from the network coordinator that indicates acceptance or rejection of the association request;
- wherein the transmitting unit transmits a first frame comprising a bandwidth request frame to the network coordinator;
- wherein the receiving unit receives a second frame comprising a bandwidth response frame in response to the first frame, wherein the bandwidth response frame includes:
  - a transmission mode field indicating whether the transmission mode is a wide-band signal or a narrow-band signal, and
  - a value indicating acceptance or rejection of a bandwidth request; and
- wherein the receiving unit receives a beacon frame, from the network coordinator, comprising a plurality of scheduling blocks, and each scheduling block comprises information about a transmission mode for data transmitted from another wireless device that belongs to the wireless network, an identifier of a wireless receiving device, and a time slot duration, wherein the transmission mode indicates whether the data is transmitted by a wide-band signal or a narrow-band signal;
- wherein a first scheduling block among the plurality of scheduling blocks indicates that the data is transmitted by the wide-band signal, and a second scheduling block among the plurality of scheduling blocks indicates that the data is transmitted by the narrow-band signal;
- an adjusting unit that adjusts the wireless device to receive the data in the transmission mode if an identifier of the wireless device is identical with the identifier of the wireless receiving device; and
- a data receiving unit that receives the data from the other wireless device that belongs to the wireless network during the time slot duration.

* * * * *